US007367098B2

(12) United States Patent
Wang

(10) Patent No.: US 7,367,098 B2
(45) Date of Patent: May 6, 2008

(54) REMOVING TOOL REMOVING A PROTECTION STRIP OF CAR

(75) Inventor: Wen-Yuan Wang, Keelung (TW)

(73) Assignee: Double Dynasty Co., Ltd., Keelung (TW)

( * ) Notice: Subject to any disclaimer, the term of this patent is extended or adjusted under 35 U.S.C. 154(b) by 0 days.

(21) Appl. No.: 11/652,669

(22) Filed: Jan. 12, 2007

(65) Prior Publication Data

US 2008/0030035 A1 Feb. 7, 2008

(30) Foreign Application Priority Data

Aug. 7, 2006 (TW) .............................. 95213799 U

(51) Int. Cl.
*B23P 19/02* (2006.01)

(52) U.S. Cl. ............................ 29/235; 29/270; 29/278; 254/25

(58) Field of Classification Search .................. 29/235, 29/270, 278; 254/131, 25, 3; 269/3, 6
See application file for complete search history.

(56) References Cited

U.S. PATENT DOCUMENTS 4,240,192 A * 12/1980 Davis ........................ 29/426.6
4,648,165 A * 3/1987 Whitehorne ................. 29/225
5,930,884 A * 8/1999 Kammeraad et al. ......... 29/453
6,886,229 B1 * 5/2005 Wilson ........................ 29/267
6,994,322 B1 * 2/2006 Wittman ..................... 254/131
2005/0193539 A1 * 9/2005 Payne ......................... 29/235

* cited by examiner

*Primary Examiner*—Lee D Wilson
(74) *Attorney, Agent, or Firm*—Troxell Law Office, PLLC

(57) ABSTRACT

A tool for removing a protection strip of car comprises mainly a handle, a stem part and a shovel blade; the stem part has an elongate straight rod with a S-shaped plate at one end thereof; the outer end of the S-shaped plate at one end thereof; the outer end of the S-shaped plate has a wider part wided together with the shove blade; the shovel blade is a L-shaped plate including two symmetrical triangle plates; the outer ends of the two triangle plates each has an edge part; when the tool is used for removing a protection strip of a car, the edge part of a plate of the L-shaped angle is set in contact with the protection strip, and is pushed with a pressure; in that case, the adhesive under the protection strip can be cut and removed easily and quickly; simultaneously, the space between the S-shaped plate and the plate part can be used for providing a guide function to the cut pressure.

3 Claims, 7 Drawing Sheets

REMOVING TOOL REMOVING A PROTECTION STRIP OF CAR

BACKGROUND OF THE INVENTION

1. Field of the Invention

This invention relates to a tool for car body, and particularly to a tool for removing a protection strip of a car.

2. Description of the Prior Art

In the conventional art, both sides of a car are usually adhered with soft protection strips respectively in order to prevent the car body from being scratched upon car passing or parking in a narrow passage; the protection strip is usually slightly higher than the surface of a car body, and it is deemed the first protection means to a car body. Since the protection strip is the first protection strip to contact or scratch to an outer thing, it is usually glued to a car body with a strong adhesive; consequently, the protection strip can only be removed later with a sharp tool.

In the conventional art, there is no particular tool so far for removing a protection strip of a car; as shown in FIGS. 1 and 2, a scraper is used as a scraping tool, which includes a handle 10 and a flat scraping plate; the front end of the scraping plate is furnished with an edge part, which is to be plugged into a slit between the protection strip and the car body 20 before lifting up the protection strip 25 with a suitable force. Since the protection strip is glued to the car body with a strong adhesive, the worker must scrape the protection strip continuously with force, and it is rather a hard work aside from the slow scraping work; further, the car body is subject to scratching because of the scraping tool being in close contact with the car body 20.

SUMMARY OF THE INVENTION

The prime object of the present invention is to provide a tool for scraping off a protection strip of car, in which one end of the stem part of the tool has a handle, while the other end thereof is furnished with a S-shaped plate welded with a shovel blade; the shovel blade includes two L-shaped plates, of which each is a triangle plate; the inner end of the triangle plate is welded to the S-shaped plate, while the outer end thereof have two wider sides each having an edge part. The outer end of the shovel blade is in contact with the adhered part of the protection strip with a suitable pressure so as to have the edge part contacted the adhered part closely for further scraping off the protection strip.

Another object of the present invention is to provide a tool for scraping off a protection strip of car, in which the shovel blade includes two symmetrical inverse-triangle plates; the plates are bent into a L-shaped angle; the narrow end of the plate is welded and connected with the end of the S-shaped plate; both sides of the welded ends form into a gap space to be used as a guide space upon the shovel blade cutting the protection strip with the edge part thereof.

Still another object of the present invention is to provide a tool for scraping off a protection strip of car, in which the outer ends of the two symmetrical triangle plates are furnished with wider edge parts respectively; the two L-shaped plates of the shovel blade can be pressed and pushed along the upper and lower adhered surfaces of the protection strip for cutting work.

A further object of the present invention is to provide a tool for scraping off a protection strip of car, in which the stem part of the tool has an elongate straight rod with a handle on one end thereof so as to facilitate gripping and positioning during scraping with force.

DETAILED DESCRIPTION OF THE PREFERRED EMBODIMENT

Figure 1:
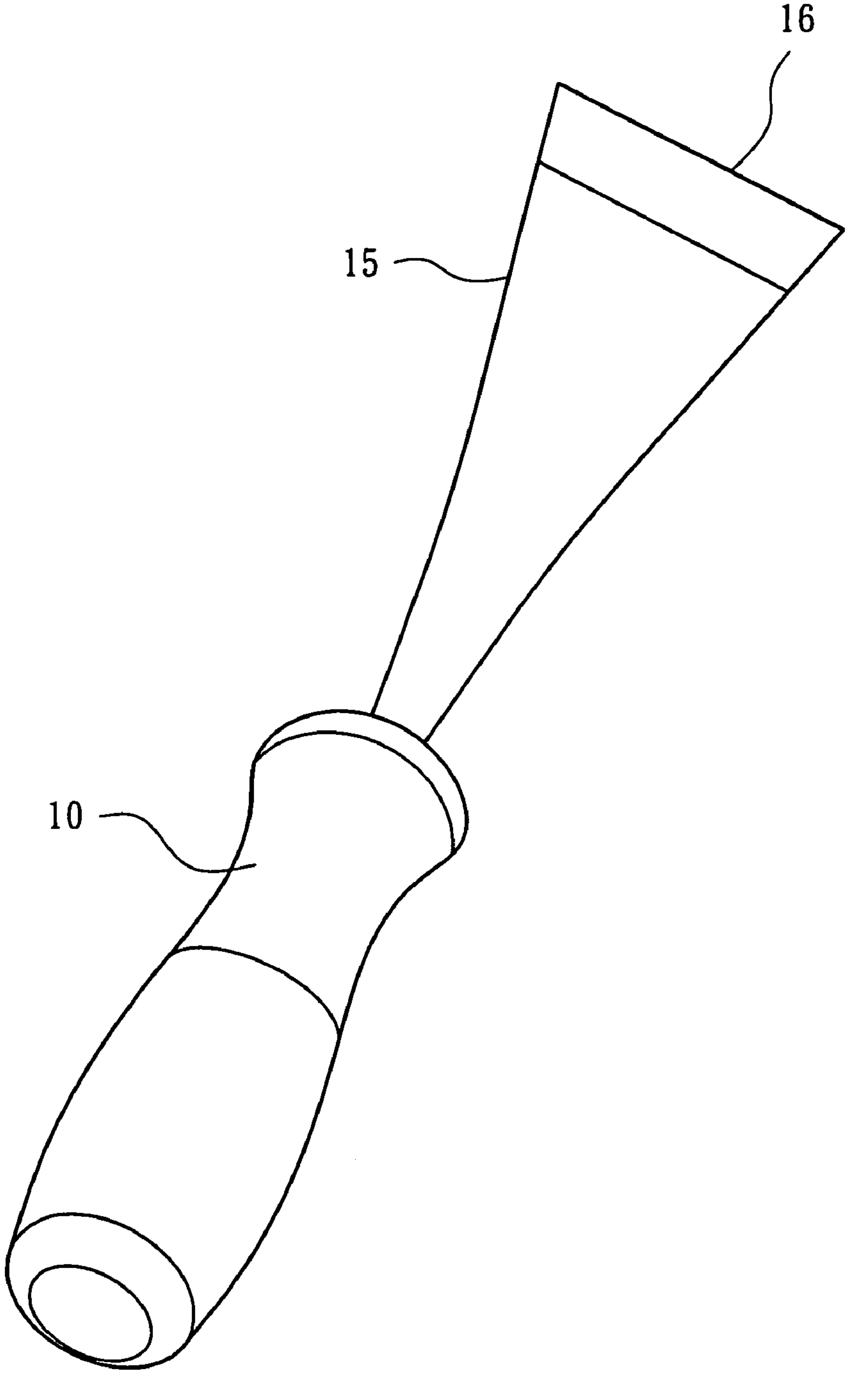
FIG. 1 (Prior Art)
FIG. 1 is a perspective view of a conventional scraper.
Figure 2:
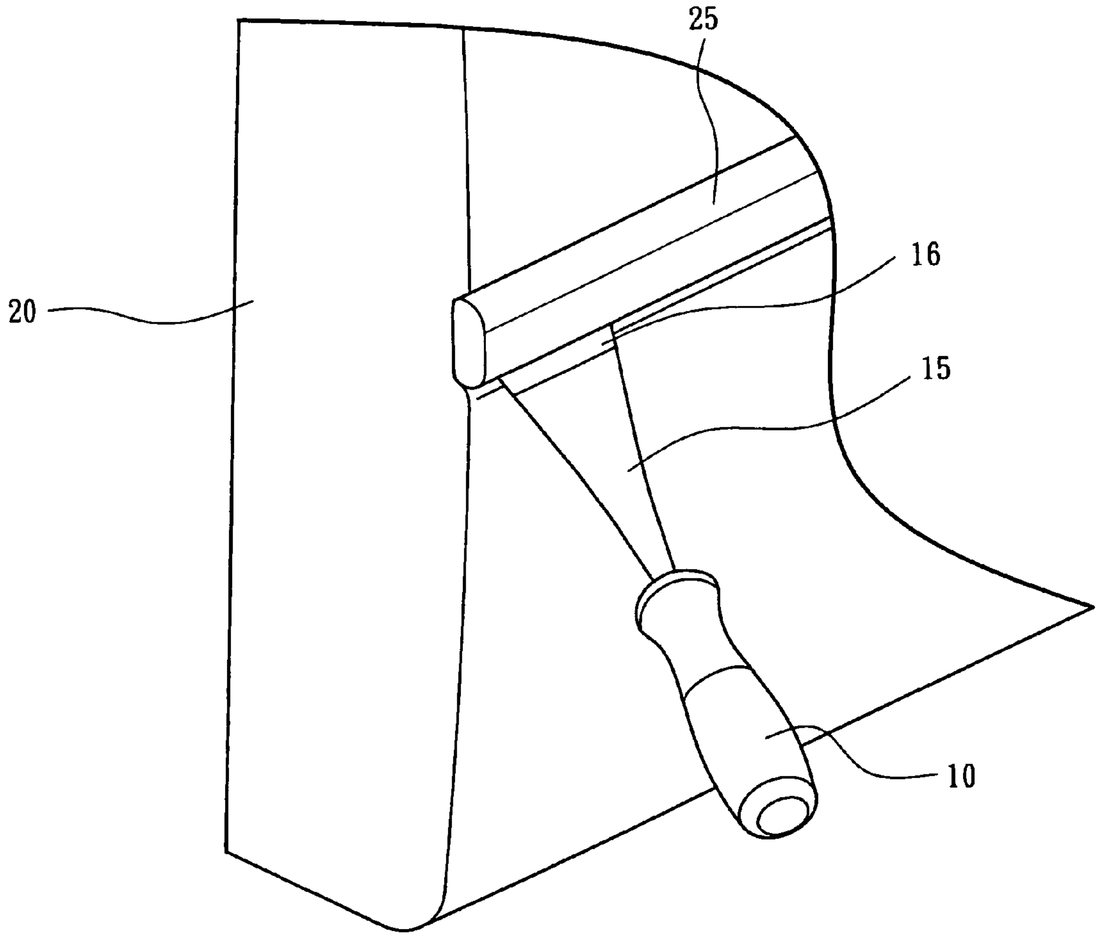
FIG. 2 (Prior Art)
FIG. 2 is a perspective view of a conventional scraper, showing the scraper used to remove a protection strip.
Figure 3:
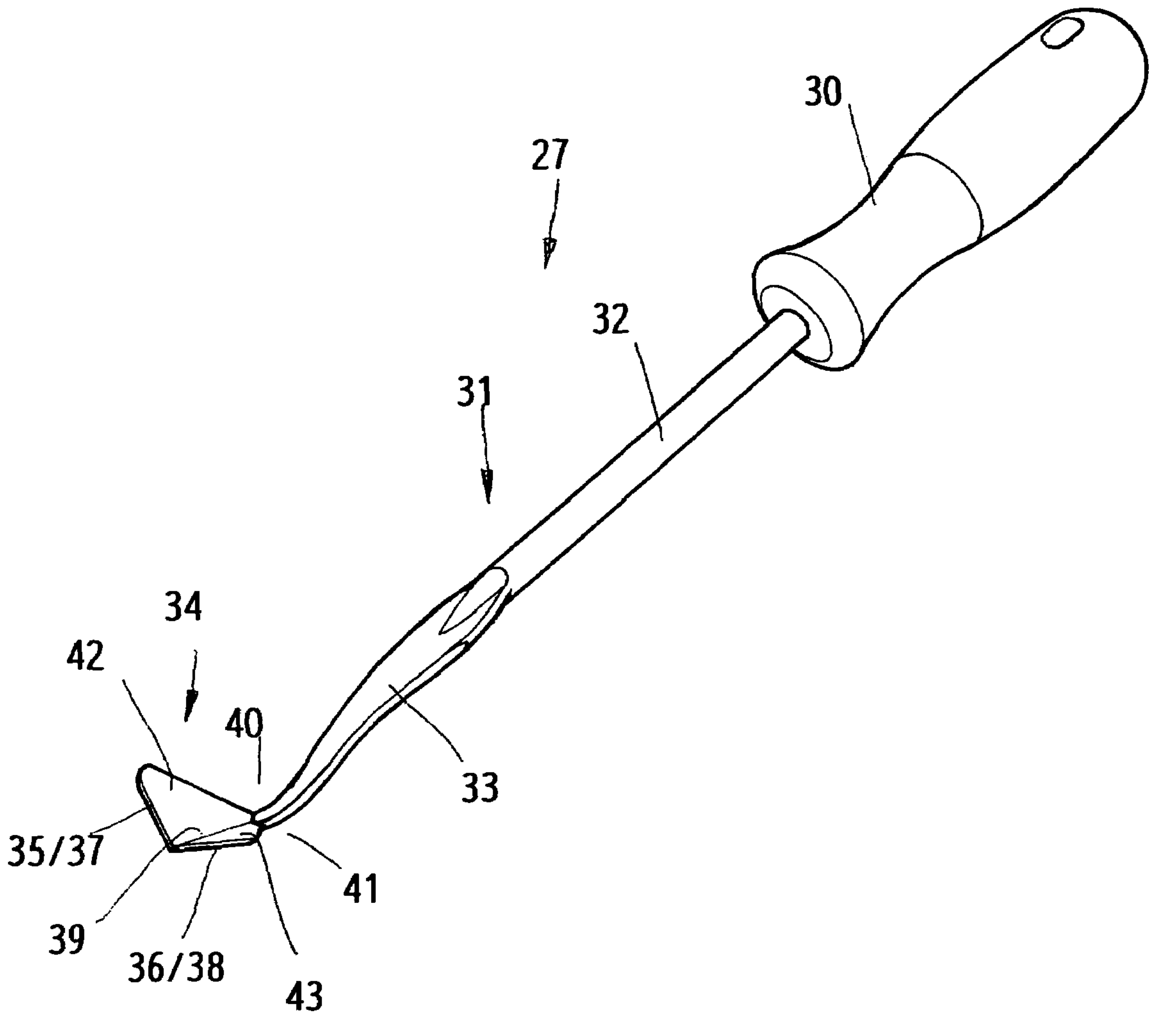
FIG. 3 is a perspective view of the present invention, showing the whole structure of a scraping tool.

This invention relates to a tool for removing a protection strip of car; as shown in FIG. 3, the scraping tool 27 comprises a handle 30, a stem part 31, and a shovel blade 34; the stem part 31 has an elongate straight rod 32, of which the outer end is furnished with a handle 30 so as to provide the user with a fulcrum, while the other end thereof is furnished with a S-shaped plate 33; the outer end of the S-shaped plate 33 is a slender and smaller end mounted and welded in the mid-recess part of the shovel blade 34.

The S-shaped plate 33 has an elongate straight rod 32 on one end with a wider part, while the other end thereof is smaller part extended to the L-shaped angle of the shovel blade 34, and is welded in place. The S-shaped plate 33 is a wider plate mounted on the rear end of the shovel blade 34 so as to provide the shovel blade 34 with a fulcrum force during the shovel blade 34 being pushed to remove a protection strip; in other words, the S-shaped plate 33 is designed to withstand a shoveling pressure upon the shovel blade 34 being used, and to prevent the tool from deforming in case of a higher pressure being applied.

Figure 4:
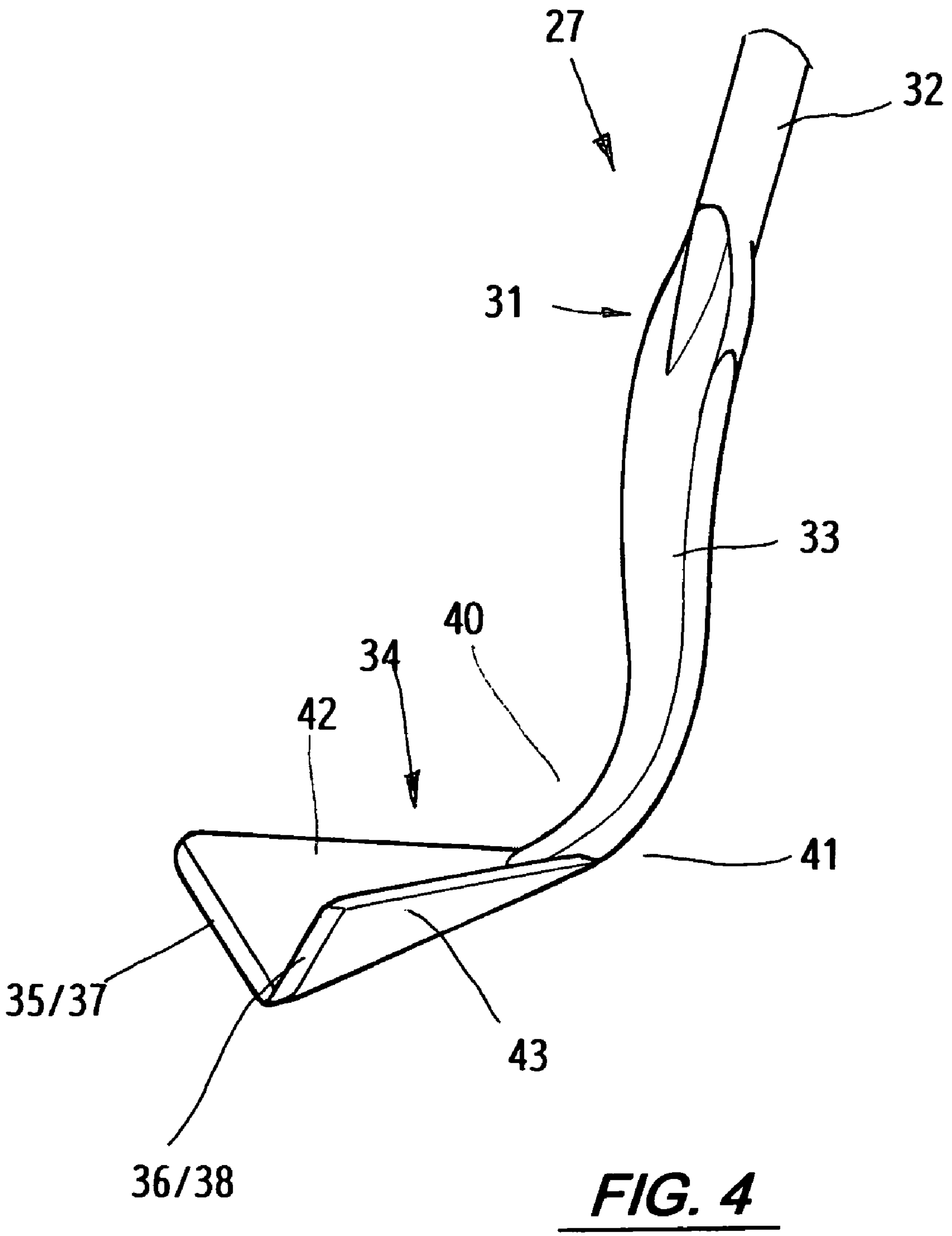
FIG. 4 is a perspective view of the present invention, showing the structure of the front end of the scraping tool.
Figure 5:
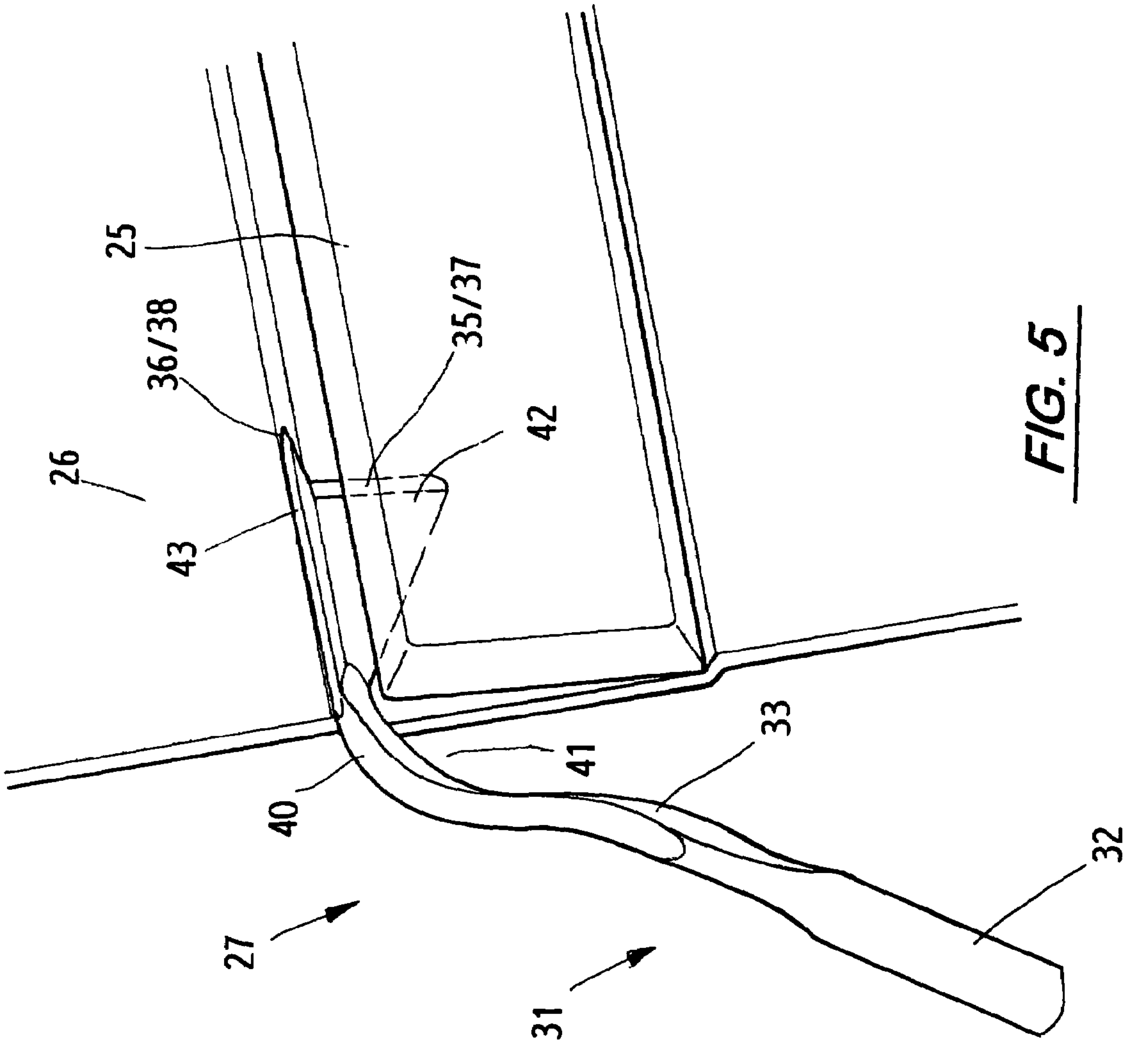
FIG. 5 is a perspective view of the present invention, showing the protection strip being shoveled off with a scraping tool.
Figure 6:
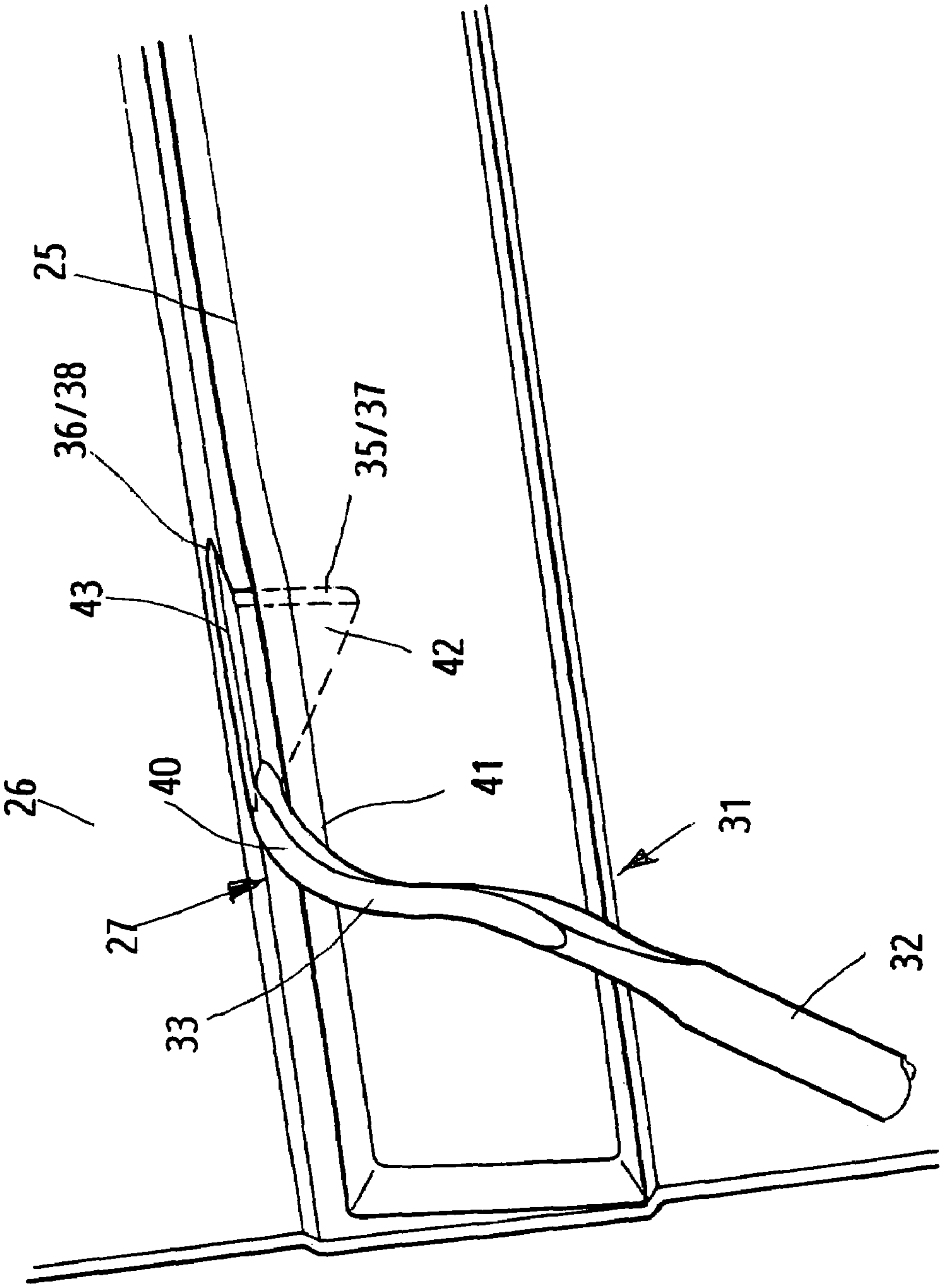
FIG. 6 is a perspective view of the present invention, showing the guide operation condition between the protection strip and the shovel blade.
Figure 7:
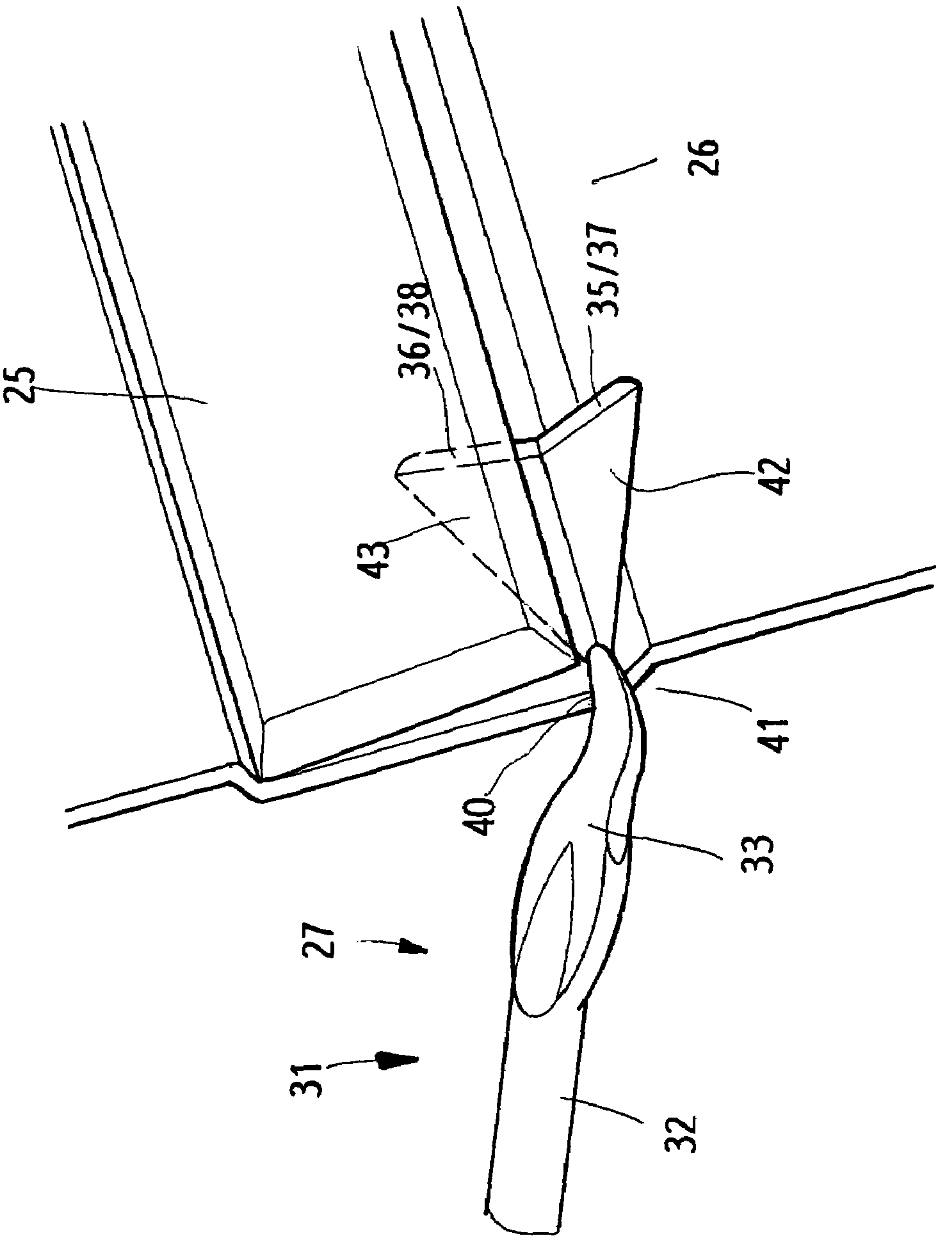
FIG. 7 is a perspective view of the present invention, showing the adhered surface of the protection strip being cut.

Referring to FIGS. 3 to 5, the shovel blade 34 on one end of the stem part 31 includes two symmetrical pieces of triangle plates 42 and 43, which are formed at an angle of 90 degrees. The outer ends of the two plates 42 and 43 have wider end surfaces 35 and 36 respectively, while the inner ends thereof are short end surfaces. The inner ends thereof are mounted with the end of the S-shaped plate 33, and then they are welded together.

The outer end surfaces 35 and 36 of the two plates 42 and 43 are wider surfaces respectively; the end surfaces 35 and 36 are furnished with edge parts 37 and 38 respectively. When the shovel blade 34 is used for removing a protection strip 25 of a car body 26, the edge part 37 of the end surface 35 of a plate 42 should be set in contact with the adhesive part between the protection strip 25 and the car body 26; then, the user holds the handle 30 as a fulcrum to apply a pressure to the stem part 31 so as to push the plate 42 of the shovel blade 34 to move along the adhesive on the protection strip 25; simultaneously, the edge part 37 of the end surface 35 of the shovel blade 34 will shovel off the protection strip.

When the protection strip 25 is removing, the plate 42 on one side of the shovel blade 34 is used for cutting, while the other plate 43 at an angle of 90 degrees to the plate 42 is used for reinforcing the plate 42 to prevent the plate 42 from deforming. Since the protection strip 25 has a given length, the protection strip 25 cut off must have a guide groove during the shovel blade 34 being pushed; otherwise, the shovel blade 34 would shift from the correct direction to affect pressure applied.

The plate 43 is furnished at an angle of 90 degrees to the plate 42; when the edge part 37 of the end surface 35 of plate 42 is pushed for cutting the protection strip 25, the plate 43 would provide a guide surface to have the protection strip 25 cut off moved outwards; that guide function is particularly true upon the protection strip 25 passing through a space between the shovel blade 34 and the S-shaped plate 33; in other words, the guide function of the plate 43 would not cause any resistance upon the shovel blade 34 being pushed with a pressure.

The welding connection part between the inner end of the shovel blade 34 and the welded point of the S-shaped plate 33 at one end of the stem part 31 is a slender plate; the outer end of the welding connection part becomes wider and wider until the connection point between the shovel blade 34 and the S-shaped plate 33. The S-shaped plate 33 is substantially a curved part so as reinforce the stress to a pressure; further, two guide spaces 40 and 41 are furnished between the S-shaped plate 33 and the shovel blade 34; after the protection strip 25 is cut, the plate 42 can be pushed forwardly along the guide space so as to cut and remove the protection strip 25 completely.

The protection strip 25 on the car body 26 usually has a considerable width; it requires a wide tool and high pressure to remove the protection strip at one time; it is deemed rather difficult to remove the protection strip with manual method; therefore, the two plates 42 and 43 of the shovel blade 34 are designed to have an angle of 90 degrees each other, and have a suitable width respectively. The front ends of the two plates 42 and 43 furnished with two edge parts 37 and 38 respectively so as to remove a protection strip 25 of a car body 26 in different direction quickly.

While the invention has been described with reference to specific embodiments it must be understood that those embodiments are susceptible to many changes, substitutions, and modifications that will be readily apparent to those having ordinary skill in the art without departing from the scope and spirit of the invention.

What is claimed is:

1. A tool for removing a protection strip of a car comprising:

a handle furnished at one end of a straight elongate rod;

a stem part including said straight elongate rod, and other end of said stem part is furnished with a S-shaped plate, of which outer end is connected and welded at a vertical corner of a shovel blade;

said shovel blade including two plates formed into a 90 degree angle to each other; outer ends of said plates having wider sides respectively; inner ends thereof formed into an inverse triangle; short plane part thereof connected and welded with said stem part.

2. A tool for removing a protection strip of car as claimed in claim 1, wherein said S-shaped plate is selected from a group consisting of a rod and a plate, and one end thereof has a narrow surface welded to said shovel blade.

3. A tool for removing a protection strip of car as claimed in claim 1, wherein said shovel blade of front end of said stem part has a wider end surface furnished with an edge part.

* * * * *